United States Patent [19]
Inoue

[11] 3,721,557
[45] March 20, 1973

[54] METHOD FOR TRANSFERRING COLORED IMAGE AND LIGHT-SENSITIVE TRANSFER SHEETS THEREFOR

[75] Inventor: Nobuyuki Inoue, Kawagoe City, Japan

[73] Assignee: Process Shizai Company Limited, Tokyo, Japan

[22] Filed: March 6, 1969

[21] Appl. No.: 804,908

[30] Foreign Application Priority Data

Aug. 14, 1968 Japan ....................43/57367

[52] U.S. Cl. ....................96/28, 96/29 D
[51] Int. Cl. ....................G03c 5/54
[58] Field of Search ....................96/28, 29, 2, 83

[56] References Cited

UNITED STATES PATENTS

| | | | |
|---|---|---|---|
| 960,939 | 6/1910 | Ives | 96/15 |
| 3,481,736 | 12/1969 | Rutt | 96/28 |
| 3,202,508 | 8/1965 | Heiart | 96/28 |
| 3,198,633 | 8/1965 | Cohen et al. | 96/28 |
| 1,873,674 | 8/1932 | Thornton | 96/28 |
| 2,626,858 | 1/1953 | McGraw et al. | 96/83 X |
| 3,210,187 | 10/1965 | Thommes | 96/83 X |
| 3,325,283 | 6/1967 | Barstow et al. | 96/83 X |
| 3,359,107 | 12/1967 | Goffe et al. | 96/83 |

*Primary Examiner*—J. Travis Brown
*Assistant Examiner*—John L. Goodrow
*Attorney*—Larson, Taylor & Hinds

[57] ABSTRACT

A method of preparing a mono-color or multicolor image by transferring one or more transparent positive images of different primary colors, such as magenta, yellow, cyan, and black on an image-receiving member. Positive colored images of primary colors are produced on light-sensitive transfer sheets by exposing the light-sensitive transfer sheets to actinic light through a picture, such as color separation films, such as magenta, yellow, cyan, and black screened color separation negatives or positives, respectively, and developing the transfer sheets thus exposed. The positive colored images are transferred in turn onto an image-receiving member in registration with each other, while inserting an adhesive layer with each positive colored image and receiving surface of the image-receiving member. A light-sensitive transfer sheet usable for preparing the color-proofing sheet, which comprises a support, a stripping film laminated on the support, and a photosensitive layer overlaid on the stripping film and mainly consisting of photopolymer. After exposure and development, each colored image formed on the light-sensitive transfer sheet is transferred onto an image-receiving member by inserting an adhesive layer therebetween.

16 Claims, 6 Drawing Figures

METHOD FOR TRANSFERRING COLORED IMAGE AND LIGHT-SENSITIVE TRANSFER SHEETS THEREFOR

This invention relates to a method for transferring colored images and light-sensitive transfer sheets therefor. More particularly, this invention relates to a method of transferring colored image, characterized by comprising forming one or more colored images, each on a photosensitive layer overlaid on a stripping layer, the photosensitive layer mainly consisting of photopolymer whose solubility selectively varies upon imagewise exposure, the transferring such one or more colored images on an image-receiving member together with the stripping film in registration with each other while inserting an adhesive layer between each colored image and the receiving surface of the image-receiving member. This invention also relates to a light-sensitive transfer sheet comprising a support, a stripping layer coated on said support, and a photosensitive layer overlaid on said stripping layer and mainly consisting of photopolymer, said photosensitive layer producing colored image therein by exposure and development, said stripping film being separable from said support upon transfer of said colored image produced on said photosensitive layer to an image-receiving member by inserting an adhesive layer therebetween.

The method of transferring colored images can be, with particular advantage, applied to preparation of a color-proofing sheet in multicolored printing. Color-proofing sheets for multicolored printing have heretofore been made by using a printing press or a proof press while taking all the steps necessary for actual multicolored printing, and such conventional method of color-proofing has been costly and time-consuming. It has been proposed to use photographic process, especially a photographic process using photopolymer. For simplicity's sake, the invention will be described by taking an application to color-proofing.

There are two known types of photographic color-proofing methods using photopolymer; namely, surprint type and overlay type.

In the known surprint type color-proofing method, a color-proofing sheet is prepared by successively producing prints of different colors on an opaque support from different color-separation films, respectively, while applying photosensitive solutions of photopolymers of corresponding colors on the opaque support in succession.

In the known overlay type color-proofing method, an independent transparent plastic support is used for producing a print of each color-separation film by applying a photosensitive solution of photopolymer of the corresponding color, and a plurality of such supports carrying prints of corresponding colors are superposed with each other on a white sheet to produce a color-proofing sheet.

The aforesaid surprint type color-proofing method has a disadvantage in that the successive application of the different photosensitive solutions for producing different color prints is a complicated and time-consuming process, while the overlay type color-proofing method has a disadvantage in that the superposed plastic supports tend to darken the color-proofing sheet, and as a result of it, the impression of the color-proofing sheet thus prepared becomes vastly different from copies actually obtained by a conventional printing press or a conventional proof press.

Therefore, an object of the present invention is to provide an improved color-proofing method by using light-sensitive transfer sheets, so as to overcome the aforesaid difficulties of known methods. With the method for color-proofing according to the present invention, it is possible to produce a color-proofing sheet having a close resemblance to actual prints to be made at a considerably reduced man-hours and at a much lower cost as compared with those of the known methods. Accordingly, the method of the present invention facilitates effective checking of the tone balance, the color balance, and the dot quality of each color-separation film, so that those color-separated films which are in need of retouching prior to actual printing can be quickly located. Thus, the color-proofing method according to the present invention contributes greatly to the industry.

According to the present invention, there is provided an improved method for transferring a colored image, comprising exposing imagewise to actinic light a light-sensitive transfer sheet as aforesaid, developing the photosensitive layer to produce a colored image upon development, applying an adhesive layer to either the developed image or an image-receiving member, pressing the image into adhesive contact with the image-receiving member, and peeling off the support from the stripping layer to transfer the image onto the image-receiving member together with the stripping layer transfer sheets in turn against an image-receiving sheet while inserting an adhesive layer between each colored image to be transferred and receiving surface of said image-receiving sheet, respectively, peeling off the support from each light-sensitive sheet upon completion of transfer of the corresponding colored image onto the image-receiving sheet together with the related stripping layer, and repeating said pressing and peeling until all the colored images of different colors are transferred onto the image-receiving sheet.

In the color-proofing method according to the present invention, a first colored image is transferred onto an image-receiving sheet, and a second colored image, which is made by using a second color-separation negative or positive, is superposed on the first colored image transferred on the image-receiving sheet, and third and other colored images are superposed on the previously transferred colored images on the image-receiving sheet in the aforesaid manner. Usually, the color-proofing sheet is completed by superposing three or more differently colored images.

There are four different approaches to the production of a colored image on the light-sensitive transfer sheet, usable in the method of the present invention.

1. A light-sensitive transfer sheet is prepared by using a photosensitive layer by adding coloring agents, such as various pigments and dyestuffs, to negative acting photopolymer. The light-sensitive transfer sheet thus prepared is exposed to actinic light and developed by using a suitable developer for removing unhardened portions of the photopolymer in the photosensitive layer, so as to produce a colored image.

2. A light-sensitive transfer sheet is prepared without adding coloring agent in the photosensitive layer. After exposure, a latent image is developed by using a developer containing coloring agent, or the latent image is developed without coloring and then the developed image is immersed in a solution containing coloring agent.
3. A light-sensitive transfer sheet is prepared without adding coloring agent in the photosensitive layer. The transfer sheet is exposed and developed for producing a non-colored image. A coloring lacquer is prepared by dissolving resin material in a volatile solvent, which is not miscible with water, adding coloring agent in the resin solution thus prepared, mixing the resin solution containing coloring agent with an aqueous solution of water-soluble polymer, and emulsifying the mixture. The lacquer is uniformly applied to the non-colored image for coloring.

It is also possible to use the lacquer for coloring together with a developer for effecting coloring together with development.
4. A light-sensitive transfer sheet is prepared without adding coloring agent in the photosensitive layer, yet by overlaying an organic resin layer containing coloring agent upon the photosensitive layer. After exposure, a latent image is developed by using a developer containing an ingredient for developing the photosensitive layer and another ingredient for swelling and softening the organic resin layer.

In either approach, the coloring agents for coloring the developed image in the transfer sheet should have the same color as that of the ink to be used in actual printing, and it is preferable to use the same pigments as those of the printing ink as far as possible. The color density and the transparency of the colored image thus formed should be so controlled as to be identical with those actually achievable by the printing ink.

After color images are formed on the transfer sheet in the aforesaid manner, an adhesive layer is applied to either the colored image formed on the stripping layer or the receiving surface of the image-receiving sheet, and the transfer sheet and the image-receiving sheet are brought in contact with each other with the adhesive layer placed therebetween, and the two sheets are pressed toward each other. The support of the transfer sheet is then peeled off from the combination of the two sheets, so that the colored image is transferred onto the image-receiving sheet together with the stripping layer.

In order to conduct ordinary color-proofing, colored images of primary colors are formed in the photosensitive photopolymer layers on the corresponding light-sensitive transfer sheets, respectively, by effecting exposure through color-separation films of the primary colors, which are made from a colored original, and then by developing the thus exposed transfer sheet. The colored images of the primary colors thus formed are successively transferred to and superposed with each other on a suitable image-receiving sheet, such as a white sheet of art paper, coated paper, synthetic paper, plastic film, etc. A register pin system is used in superposing the colored images of different primary colors in correct registration with each other.

For a better understanding of the invention, reference is made to the accompanying drawings, in which.

Like parts and members are designated by like numerals and symbols throughout the drawings.

In the specific embodiment of the present invention, as illustrated in the figures, use is made of two light-sensitive transfer sheets, each having a photosensitive layer consisting of negative-acting photopolymer, which becomes insoluble upon exposure to actinic light. The photosensitive layers of the two light-sensitive transfer sheets contain coloring agents related to different primary colors between each other, e.g., yellow agent and magenta agent. The two light-sensitive transfer sheets are exposed to actinic light through corresponding screened color-separation negatives, and then developed, so that colored images of the aforesaid primary colors, e.g., yellow and magenta, are produced on the light-sensitive transfer sheets, respectively. Then, adhesive layers are applied on the colored images, respectively, and the two colored images are successively transferred onto an image-receiving sheet made of paper. Thus, a color-proofing sheet of the two primary colors is completed.

The method for color-proofing according to the present invention is not restricted to such illustrated embodiment alone, but the method of the present invention can be embodied in a great number of different ways. Thus, it should be understood that illustrated embodiment is only for illustrating an example, and is not limiting the present invention.

Figure 1:
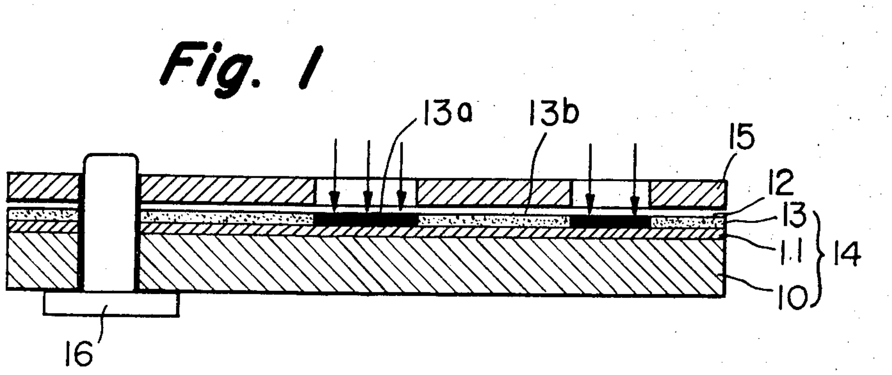
FIG. 1 is a schematic sectional view illustrating the construction of a light-sensitive transfer sheet usable in the method according to the present invention, shown in the state as being exposed to actinic light while being registered with an image-receiving sheet and with a screened color-separation negative.

Referring to FIG. 1, a stripping layer 11 is overlaid on a support 10, and a photosensitive layer 13 is overlaid in this stripping layer 11. The photosensitive layer 13, in this particular embodiment, consists of negative-acting photopolymer and coloring agent 12 for yellow. In the figure, the particle size of coloring agent is exaggeratedly shown. The base 10, the stripping layer 11 and the photosensitive layer 13 constitute a light-sensitive transfer sheet 14.

A screened color-separation negative 15 for yellow is registered on the transfer sheet 14 in direct contact with the photosensitive layer 14, by using a register pin system 16. Then, the photosensitive layer 13 is exposed to actinic light from a light source (not shown), so that exposed portions 13*a* of the photosensitive layer 13 become insoluble.

Figure 2:
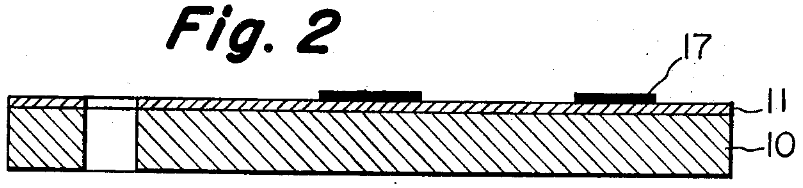
FIG. 2 is a schematic sectional view of the light-sensitive transfer sheet, shown in the state as developed.

When the photosensitive layer 13 thus exposed is developed by a developer capable of dissolving the non-exposed portions 13*b* of the photosensitive layer, a colored positive image 17, an yellow positive image in this embodiment, is formed, as shown in FIG. 2.

Figure 3:
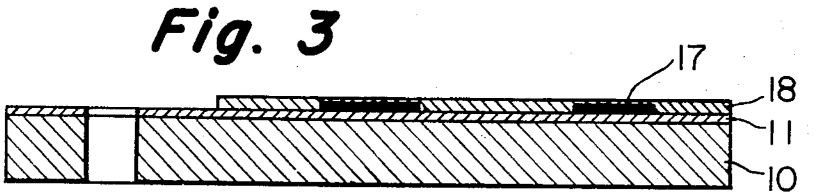
FIG. 3 is a schematic sectional view of the light-sensitive transfer sheet having an adhesive layer applied thereon.

FIG. 3 shows the light-sensitive transfer sheet 14, in the state as provided with an adhesive layer 18 applied on the colored image 17, which is produced by exposing and developing the photosensitive layer 13, as described above.

Figure 4:
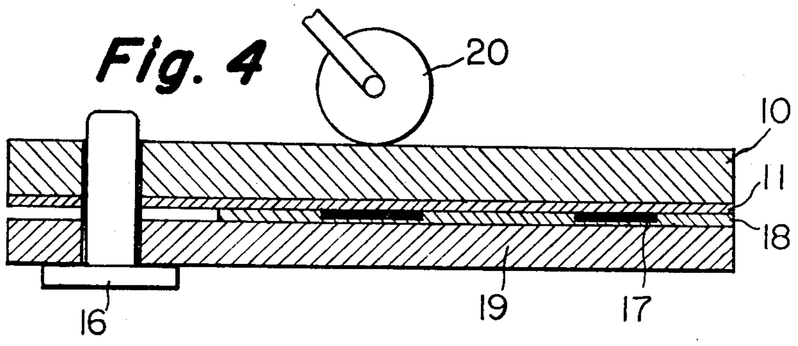
FIG. 4 is a schematic sectional view, illustrating the manner in which a colored image on the light-sensitive transfer sheet is transferred to the image-receiving sheet by pressing with a roller.

The transfer sheet 14 with the adhesive layer 18 applied thereon is then placed on an image-receiving sheet 19, for instance, a sheet of white paper, while registering the light-sensitive transfer sheet 14 with the image-receiving sheet 19 by the register pin system 16, as depicted in FIG. 4. A roller 20 is used to press manually the light-sensitive transfer sheet 14 against the image-receiving sheet 19.

Figure 5:
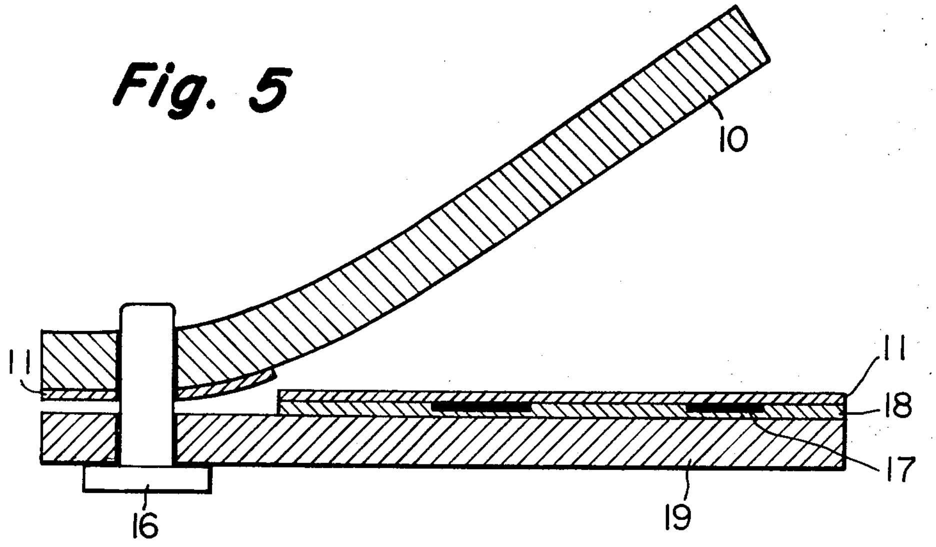
FIG. 5 is a schematic sectional view, illustrating the manner in which a support of the light-sensitive transfer sheet is peeled off.

After the pressing by the roller 20, if the support 10 is peeled off from the combination of the light-sensitive transfer sheet 14 and the image-receiving sheet 19, the colored image 17, the yellow positive image, is transferred to the image-receiving sheet 19 together with the stripping layer 11 and the adhesive layer 18, as shown in FIG. 5.

Figure 6:
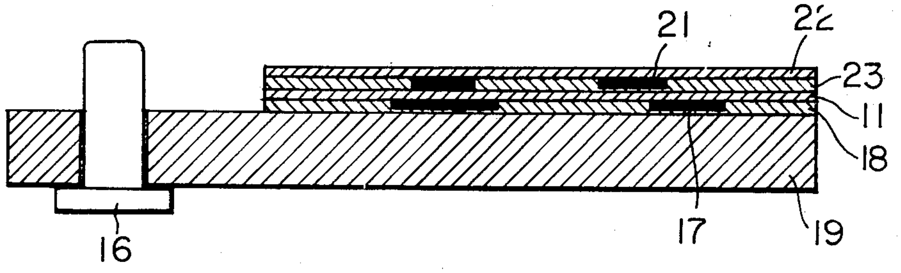
FIG. 6 is a schematic sectional view, illustrating two colored images of different primary colors superposed with each other on the image-receiving sheet.

Similarly, another colored image 21 of a different primary color, for instance, a magenta positive image, can be superposed on the color image 17, e.g., the yellow positive image, together with another stripping film 22 and another adhesive layer 23, as illustrated in FIG. 6. The image-receiving sheet 19 with the colored images 17 and 21 representing the two primary colors, e.g., yellow and magenta, can be used as a color-proofing sheet for the two primary colors.

In addition to the illustrated embodiment, the method according to the present invention can be applied to various other processes; for instance, a process using a light-sensitive transfer sheet having a photosensitive layer consisting of positive-acting photopolymers, a process using a light-sensitive transfer sheet having a photosensitive layer containing no coloring agent, in which colored images are produced by adding coloring agents in the course of developing or after completion of developing, a process using an adhesive layer applied on an image-receiving sheet instead of a light-sensitive transfer sheet, a process using heat-sensitive adhesive instead of pressure-sensitive adhesive, a process superposing a single colored image or three or more colored images of different colors on an image-receiving sheet, a process using a register system other than the pin-register-system, and other like processes. The aforesaid process corresponds to the approach (1) of the aforesaid four approaches, and the remaining approaches (2) to (4) can be also used by slightly modifying the illustrated embodiment. Since the essential principle of the method according to the present invention is the same throughout the different embodiments thereof, or different approaches, explanation of other processes embodying the present invention will not be illustrated by drawings.

The support to be used in the method according to the present invention should have a high stability of dimension against moisture variation and temperature variation, so that images of different colors should not alter their dimensions before transferring. From such viewpoint, the most suitable material for the support is biaxially oriented polyethylene terephthalate polyester film, and other suitable materials include a cellulose acetate film, a polyvinyl chloride film, a polystyrene film, and a polypropylene film.

The stripping layer overlaid on the support is, for instance, a 1–5 micron thick transparent resin film, which is required to stick fast to the support before and during exposure and during development of the light-sensitive transfer sheet, but to be easily separable from the support during the transferring operation of the colored image by using the adhesive layer. The material for the stripping layer is selected from the group consisting of polystyrene, polyvinyl acetate, polyacrylate, polymethylmethacrylate, methylmethacrylate-acrylate copolymer, methylmethacrylate-vinyl acetate copolymer, polyvinyl chloride, polyvinylidene chloride, polyvinyl chloride-polyvinyl acetate copolymer, polyvinyl butyral, cellulose acetate phthalate, ethyl cellulose, nitrocellulose, cyclized rubber, shellac, a mixture of methoxymethyl-nylon and partially esterified compound of styrene-maleic anhydride copolymer, a mixture of the aforesaid resins, and a mixture of the aforesaid resins added with other resins or plasticizers.

According to the present invention, it is also possible to insert an auxiliary adhesive layer between the stripping layer and the photosensitive layer mainly consisting of photopolymer, for improving the bondage between the stripping layer and the photosensitive layer. An example of such auxiliary adhesive layer consists of vinylidene chloride-acrylonitrile copolymer.

It should be noted here that the resin constituting the stripping layer must not dissolve in solvent for photopolymers in the photosensitive layer overlaid thereon and should not be soluble in a developer for the transfer sheet, because the photosensitive layer is formed on the stripping layer by applying a solution of photopolymers on the stripping layer and then drying, and colored images are produced by developing the exposed photosensitive layer by using the developer.

The photosensitive layer formed on the stripping layer consists of photopolymer which effects chemical reactions such as polymerization, crosslinking, dimerization, decrosslinking, decomposition, and rearrangement, in response to incident actinic light thereto, and as a result of it, the solubility of the photopolymer into the developer increases or decreases. There are two types of photopolymers; namely, negative-acting photopolymer which is normally soluble in a developer and becomes insoluble in the developer upon exposure to actinic light, and positive-acting photopolymer which is normally insoluble in a developer and becomes soluble in the developer upon exposure to actinic light. Some examples of the photopolymer are as follows.

1. A composition consisting of hydrophilic polymer, such as gelatine, glue, and polyvinyl alcohol; and photosensitive ferric salts producing ferrous ions upon exposure to actinic light, such as ferric ammonium citrate, ferric ammonium oxalate, and ferric sodium oxalate.
2. A composition consisting of hydrophilic polymer, such as gelatine, fish glue, gum arabic, polyvinyl alcohol, polyacrylamide, carboxymethylcellulose, hydroxyethyl cellulose, polyvinylmethyl ether-maleic anhydride copolymer; tetrazonium salt of diamino compounds, such as diaminodiphenylamine, 0-dianisidine, and 4,4'-diaminodiphenylmethane, or diazo resin made by condensation of p-diazodiphenylamine and paraformaldehyde.

3. A composition consisting of organic azido compounds, such as disodium 4,4'-diazidostilbene-2,2'-disulfonate, disodium 1,5-diazidonaphthalene-3,7-disulfonate, sodium 3'-azido-4-azidobenzalacetophenone-2-sulphonate, sodium 4,4'-diazidostilbene-α-carboxylate, sodium di(4-azido-2'-hydroxybenzal)acetone-2-sulfonate, sodium 4-azidobenzalacetophenone-2sulfonate, and disodium 4,4'-diazidodiphenyl-3,3'-disulfonate; and hydrophilic polymer, such as polyacrylamide, polyvinyl pyrrolidine, polyacrylic acid, gelatine, casein, albumin, gum arabic, carboxymethylcellulose, and hydroxyethyl cellulose.
4. A composition consisting of aromatic azido compound, such as 4,4'-diazidostilbene, 4,4'-diazidochalcon, and 4,4'-diazido-dibenzalacetone; and cyclized rubber, natural rubber, synthesized rubber, or polymer soluble in an organic solvent.
5. Positive type photopolymer consisting of alkali-soluble resin and quinone-diazido compound, such as naphthoquinone-1,2-diazido-sulfonic ester or sulfonamide.
6. A composition consisting of polymer having a cinnamoyl group introduced in the molecule thereof, such as polyvinyl cinnamate; and sensitizer, such as 5-nitroacenaphthene, 1,2-benzanthraquinone, and p,p'-tetramethyldiaminodiphenylketone.
7. A composition consisting of a initiator, such as 9,10-anthraquinone; an ester obtained from polyglycols and acrylic acid or α-alkyl acrylic acid; and a suitable binder.
8. A composition consisting of ethylenically unsaturated monomer, such as acrylamide, calcium acrylate, and N,N'-methylenebisacrylamide; light-sensitive ferric salts, such as ferric ammonium citrate, ferric sodium oxalate, and ferric ammonium oxalate; and hydrophilic polymer, such as gelatine, and polyvinyl alcohol.
9. A composition consisting of ethylenically unsaturated monomer, such as acrylamide, methacrylamide, and acrylic acid; a photoreducible dye, such as methylene blue, rose bengale, phloxin, erythrosine, eosine, fluorescein, acriflavin, thionine, riboflavin, chlorophyll, brilliant green, and methylene green; a reducing agent, such as ascorbic acid, hydroxylamine, thiourea, glutathione, ethylenediamine-tetraacetic acid sodium salt, and ferrous sulfate; hydrophilic polymer, such as gelatine, polyvinyl alcohol, polyacrylamide, carboxymethylcellulose, and hydroxyethylcellulose; and if desired, a cross-linking agent, such as calcium acrylate, and N,N'-methylenebisacrylamide.
10. A positive-acting photopolymer having an 0-nitro-benzaldehyde group, such as bis-3-formyl-4-nitrophenylphthalate, and 3-formyl-4-nitrophenylcarbonate.
11. Stable salt of diazo compound: such as sulfate, phosphate, zinc chloride double salt, cadmium chloride double salt, p-toluene sulfonate, or ammonium fluoroborate of diazo compound.
12. Stable salt of condensate of diazo compound and formaldehyde: such as sulfate, phosphate, zinc chloride double salt, cadmium chloride double salt, p-toluene sulfonate, or ammonium fluoroborate of the condensate.
13. Positive-acting photopolymer: such as reaction product of water-soluble complex cyanide with diazonium salt or with condensate of diazonium salt and formaldehyde, e.g., reaction product of potassium ferro-cyanide with diazonium salt or the last-mentioned condensate (as disclosed in U.S. Pat. No. 3,113,023); reaction product of diazonium salt and oxygenated anion of heteropolycomplex or iso-poly-complex (as disclosed in U.S. Pat. No. 3,211,553); mixture of diazonium salt and phenol resin novolak (as disclosed in U.S. Pat. No. 944,884); and the like.

The coloring agent for producing colored images of photopolymer usable in the method according to the present invention is pigment or dyestuff. Therefore, it is necessary to provide pigments or dyestuffs having colors identical with standard colors of inks required for color-proofing; for instance, yellow, magenta, cyan, and back. In addition, it is possible to use other pigments and dyestuffs for non-standard colors, metallic powder, white pigment, and fluorescent pigment.

Typical examples of coloring agents usable in the present invention are as follows:

1. Pigments; Benzidine Yellow G (C.I. 21090), Benzidine Yellow GR (C.I. 21100), Permanent Yellow FGL (a product of Farbwerke Hoechst A.G.), Permanent Yellow DHG Transparent-23 (a product of Farbwerke Hoechst A.G.), Brilliant Carmine 6B (C.I. 15850), Rhodamine 6G Lake (C.I. 45160), Rhodamine B Lake (C.I. 45170), Watchung Red (C.I. 15865), Phthalocyanine Blue non-crystal (C.I. 74160), a partial chloride of Phthalocyanine Blue (C.I. 74250), phthalocyanine Green (C.I. 74260), carbon black, Prussian blue, and a mixture thereof.
2. Aqueous colloidal dispersion of pigments; Permanent Yellow FGL Colanyl (a product of Hoechst A.G.), Permanent Carmine FBB Colanyl (a product of Farbwerke Hoechst A.G.), Imperon Blue highly concentrated (a product of Farbwerke Hoechst A.G.), Heliogen Blue B Colanyl (a product of Badish Aniline & Soda Fabrik A.G.), Luconyl Green GN (a product of Badish Aniline & Soda Fabrik A.G.), and Aquablack 41A (a product of Columbian Carbon Company).
3. Oil-soluble dyes; Fat Yellow 5G, Fat Yellow 3G, Fat Red G, Fat Red HRR, Fat Red 5B, Fat Black HB, Zapon Fast Black RE, Zapon Fast Black B, Zapon Fast Blue HFL, Zapon Fast Blue FLE, Zapon Fast Red BB, Zapon Fast Red BE, Zapon Fast Fire Red B, Zapon Fast Red GE, Zapon Fast Yellow G, Zapon Yellow GR, and a mixture thereof.
4. Water-soluble dyes; Direct Fast Yellow GC, Tartrazine, Rose Bengale, Safranine T, Thodamine B, Congo Red, Direct Fast Scarlet 4BS, Methylene Blue, Soluble Blue, Direct Sky Blue 5B, Acid cyanine 6B, Victoria Blue B, Nigrosine, and a mixture thereof.

5. Dyes and pigments chemically bonded to polymers; Seikagen-0-Yellow-GA-M, Seikagen-0-Red-2BA-M, Seikagen-0-Red-R-KM, Seikagen-0-Red-R-KE, Seikagen-0-Blue-GK-M, Seikagen-0-Blue-GK-E, Seikagen-W-Yellow, Seikagen-W-Red-2BAF, and Seikagen-W-Blue-GKH, which are all products of Dainichi Seika Kogyo Company.

Adhesive usable in the method according to the present invention, for transferring colored images on the stripping layer of a light-sensitive transfer sheet onto an image-receiving sheet, can be either pressure-sensitive adhesive or heat-sensitive adhesive.

The pressure-sensitive adhesive consists of tacky resin or tacky polymer. The pressure-sensitive adhesive can be produced by adding tacky or non-tacky resin or plasticizer into polymers or elastomers which are inherently tacky.

Typical polymer or tacky component for the pressure-sensitive adhesive, to be used in the method according to the present invention, is non-vulcanized natural rubber;
vulcanized rubber;
homopolymers and copolymers of isobutylene, chloroprene, butadiene, and acrylonitrile;
copolymers prepared by copolymerizing styrene, styrene derivatives, and acrylic monomer with the last-mentioned monomers;
polyalkylvinyl ether having two to eight carbon atoms; and polymers of acrylic esters or methacrylic esters having two to eight carbon atoms, or copolymers of the polymers with vinyl acetate or vinylidene chloride.

The resin to be used as a tackifier in the method according to the present invention is rosin, hydrogenated rosin, rosin derivatives, such as ester of hydrogenated rosin, β-pinene resin, terpene resin, ketone resin, alkylphenolaldehyde resin, polyisobutylene having a low molecular weight, and other olefins.

The heat-sensitive adhesive usable in the method according to the present invention is polymer, which remains non-tacky at room temperature but becomes tacky upon heating, or a composition consisting of such polymer, a tackifier, and a plasticizer. Typical polymer for the heat-sensitive adhesive is ethylcellulose, hydroxyethylcellulose, polyvinyl butyral, polyamide resin, polyvinyl acetate, polyvinyl chloride, polyacrylate, polypropylene, and ethylene-vinyl acetate copolymer. The tackifier described in the foregoing referring to the pressure-sensitive adhesive can be also used with the heat-sensitive adhesive. An example of compositions consisting of polymer becoming tacky upon heating and a tackifier is a mixture of styrene-butadiene rubber and polyterpene resin melted together with rubber by heating, or a mixture of terpene resin and ethylene-vinyl acetate copolymer melted together with the resin by heating.

The aforesaid adhesive is dissolved in an organic solvent or dispersed in water to produce an emulsion, so that the adhesive solution is applied to a developed light-sensitive transfer sheet or applied to a fresh image-receiving sheet or an image-receiving sheet having one or more colored images transferred thereon, and then the adhesive is dried to form a thin adhesive layer. In applying the adhesive solution on the colored image or the stripping layer, due care should be taken, so that neither the colored image nor the stripping layer is dissolved, swollen, deformed, or peeled off by the solution of the adhesive. The adhesive solution can be applied to the light-sensitive transfer sheet by a suitable means, for instance, by pouring, by dipping, by brushing, by using a roller, by spraying or by using a whirler. In the case of heat-sensitive adhesive, the adhesive can be applied in the state as melted at an elevated temperature.

If it is desired to apply an adhesive layer on an image-receiving sheet, the adhesive can be at first spread on an intermediate stripping paper, so that a thin adhesive layer can be formed by drying the thus spread adhesive on the intermediate stripping paper. The intermediate stripping paper with the adhesive layer can be pressed against the image-receiving sheet while keeping the adhesive layer in contact with the image-receiving sheet, and the adhesive layer can be transferred to the image-receiving sheet by separating the intermediate stripping paper after the pressing.

In the foregoing, description is made by taking an example of preparing a color-proofing sheet for multi-color printing. However, the present invention is not restricted solely to such color-proofing sheet, and the method and the light-sensitive transfer sheet of the present invention can generally be applied to transfer of any picture. For instance, pictures consisting of lines, e.g., graphs, typed letter papers, design drawings, and the like, or photographic films having continuous tone, e.g., a picture, can be transferred by using the method or the light-sensitive transfer sheet of the present invention. The color usable in the transfer sheet of the present invention is not limited to primary colors for printing, such as yellow, magenta, cyan, and black, but any other color can be used. It is, of course, possible to transfer monochromatic image. The image-receiving member is not restricted to a sheet of white paper, but any flat or curved surface can be used for receiving images from the light-sensitive transfer sheet of the invention, for instance, paper of various colors, plastic sheets of various colors, glass, metal, veneer wood board, lumber, textile cloths, etc. The thickness of the image-receiving member is not material in transferring an image from the light-sensitive transfer sheet of the present invention. The registration system, such as a register-pin-system, can be dispensed with for transferring only one or two images, or for transferring images of simple configuration.

The invention will now be described in further detail, referring to Examples.

Example 1

A 3 micron thick stripping layer was formed on a 50 micron thick support made of a polyester film, by applying a solution of cellulose acetate phthalate in methylethyl ketone on the support and then drying. A dispersion was prepared by adding 5 gr of fish glue and 5 gr of Benzidine Yellow G in 45 gr of water and treating the solution in a ball mill. The dispersion thus prepared was added into an aqueous solution consisting of 20 gr of gelatine, 6.3 gr of ferric ammonium oxalate, and 400 gr of water, so that a photosensitive solution was produced.

A light-sensitive transfer sheet for yellow was prepared by forming a 1.5 micron thick photosensitive layer on the aforesaid stripping film by applying the photosensitive solution thus produced on the stripping layer and then drying.

Similar light-sensitive transfer sheets for magenta, cyan, and black were prepared by substituting Brilliant Carmine 6B, Phthalocyanine Blue, and a mixture of carbon black and nigrosine for Benzidine Yellow G of the last-mentioned dispersion, respectively. The light-sensitive transfer sheet for yellow was registered with a screened color-separation negative for yellow by using a register pin system and brought into contact therewith in a vacuum frame, and then the light-sensitive transfer sheet for yellow was exposed to actinic light of a 30 ampere arc lamp for 2.5 minutes, which arc lamp was spaced from the sheet by 80 cm. The exposed sheet was developed by dipping it in a 1 percent aqueous solution of hydrogen peroxide at 18°C for 2 minutes, so that the exposed portions of the photosensitive layer was hardened and became fully water-insoluble. An yellow positive image was produced by washing off the non-hardened portions of the photosensitive layer with water at 38°C. A pressure-sensitive adhesive layer was formed on the developed yellow positive image by uniformly pouring a mixture (containing 10 percent of solid component) of an aqueous emulsion of polybutylacrylate and another aqueous emulsion of polybutylmethacrylate and thereafter drying by blowing air at 50°C. The developed light-sensitive transfer sheet was registered on a sheet of white art paper with its pressure-sensitive layer kept in contact with the art paper, and the yellow transfer sheet was pressed against the art paper by a hard rubber roller, and finally the polyester support was peeled off. Thus, the yellow positive image was transferred onto the art paper together with the adhesive.

The light-sensitive transfer sheets for magenta, cyan, and black were exposed through screened color-separation negatives for magenta, cyan, and black, respectively, and developed and provided with adhesive layers in the same manner with the light-sensitive transfer sheet for yellow. The developed magenta, cyan, and black positive images on the respective light-sensitive transfer sheets were successively transferred onto the aforesaid sheet of white art paper in registration with the aforesaid yellow positive image and with each other. Thus, a color proof was completed.

It was confirmed that the same results could be obtained by substituting cellulose acetate phthalate in the last-mentioned stripping film by polyvinyl butyral, polymethylmethacrylate, copolymer of methylmethacrylate, and vinyl acetate, or copolymer of methylmethacrylate and ethylacrylate.

It was also confirmed by experiments that the last-mentioned pressure-sensitive adhesive can be substituted by an aqueous emulsion of copolymer of butylacrylate and methylmethacrylate at a mole ratio of 8:2, POLYSOL A-881 (polyacrylate-emulsion, manufactured by High Polymer Chemical Industry, Ltd., Japan) NIKASOL S-3001 (polyacrylic ester emulsion, manufactured by Nippon Carbide Industries Co., Inc., Japan), or SAIBINOL L-65 or L-60 (products of Saiden Kagaku Kogyo Kabushiki Kaisha, Japan).

Example 2

A stripping layer was formed on a polyester support by applying the following solution on the support and then drying. The solution consisted of

| | |
|---|---|
| polyvinyl butyral | 5 gr |
| butanol | 65 gr |
| toluene | 50 gr |

A photosensitive layer for magenta was made by applying the following photosensitive solution for magenta on the stripping layer and drying. To produce the photosensitive solution, an aqueous solution was prepared which consisted of

| | |
|---|---|
| casein | 5 gr |
| ammonia water (25%) | 0.3 gr |
| disodium 4,4'-diazidostilbene-2,2'-disulfonate | 0.5 gr |
| water | 80 gr |

The following ingredients were treated in a ball mill to prepare a dispersion.

| | |
|---|---|
| casein | 10 gr |
| Brilliant Carmine 6B | 10 gr |
| ammonia water (28%) | 0.5 gr |
| water | 60 gr |

The photosensitive solution for magenta was produced by adding 8.4 gr of the dispersion thus prepared into the aforesaid aqueous solution.

Light-sensitive transfer sheets for cyan, yellow, and black were produced in the manner similar to that for magenta except that the Brilliant Carmine 6B was substituted by Phthalocyanine Blue, Permanent Yellow DHG Transparent 23 (a product of Farbwerke Hoechst A.G.), and a mixture of carbon black and nigrosine, respectively.

A magenta positive image was produced by bringing the light-sensitive transfer sheet for magenta into contact with a screened color-separation negative for magenta in a vacuum frame in registration therewith, exposing the light-sensitive transfer sheet for magenta by a 2 KW xenon-arc lamp for 2 minutes, which xenon-arc lamp was spaced from the vacuum frame by 80 cm, and developing and washing the light-sensitive transfer sheet with water at 40°C to produce a magenta positive image thereon.

Immediately after the development, a pressure-sensitive adhesive layer was formed on the magenta positive image by applying a dispersion of the following composition on the colored image and blowing hot air thereon. The dispersion for the adhesive layer consisted of 1 part of POLYSOL A-881 (a polyacrylate emulsion, manufactured by High Polymer Chemical Industries Co., Ltd.) and 1 part of water. The developed light-sensitive transfer sheet for magenta was overlaid on a thick sheet of art paper while keeping its adhesive layer in contact with the art paper, and the light-sensitive transfer sheet was pressed against the art paper by a suitable pressing means, and then polyester support was peeled off. Thus, the magenta positive image was transferred onto the sheet of art paper.

Cyan, yellow, and black positive images were prepared by exposing and developing the light-sensitive transfer sheets for cyan, yellow, and black, respectively, and the thus developed positive images were applied in turn onto the magenta positive image on the art sheet, while keeping various color images in registration with each other, in the same manner as Example 1. Thereby, a color-proofing sheet was obtained. A register pin system was used for ensuring the accurate registering among different color positive images, as in Example 1.

It was confirmed by experiments that the same result was achieved by substituting POLYSOL A-881 of the aforesaid pressure-sensitive adhesive layer by POLYSOL Adhesive 40 (a synthetic rubber-emulsion, manufactured by High Polymer Chemical Industries Co., Ltd.), NIKASOL S-3001 (a polyacrylate-emulsion, manufactured by Nippon Carbide Industries Co., Ltd.), ORIBINE TAP-6123 (a product of Toyo Ink Manufacturing Co.), and SAIBINOL L-65 and L-60 (products of Saiden Kagaku Kogyo Co.).

It was also confirmed by tests that polyvinyl butyral in the aforesaid stripping layer can be substituted by copolymer of methylmethacrylate and ethylacrylate.

Example 3

A 1.5 micron thick stripping layer of cellulose acetate phthalate was formed on a 50 micron thick polyester support.

A photosensitive solution for magenta was prepared which consisted of the following ingredients.

| | |
|---|---|
| gelatine | 25 gr |
| ferric ammonium citrate | 10 gr |
| N,N'-methylenebisacrylamide | 2 gr |
| Permanent Carmine FBB Colanyl (an aqueous colloidal dispersion of a pigment manufactured by Farbwerke Hoechst A.G.) | 20 gr |
| water | 400 gr |

The photosensitive solution for magenta was applied on the stripping layer and then dried to form a 1.5 micron thick photosensitive layer, so that a light-sensitive transfer sheet for magenta was prepared.

Similarly, light-sensitive transfer sheets for cyan, yellow, and black were prepared by substituting Heliogen Blue B colanyl (a product of Badish Aniline & Soda Fabrik A.G.), Permanent Yellow FGL Colanyl (a product of Farbwerk Hoechst A.G.), and Aquablack 41A (a product of Columbia Carbon Company) for Permanent Carmine FBB Colanyl in the light-sensitive transfer sheet for magenta, respectively.

A magenta positive image was prepared by brining the light-sensitive transfer sheet for magenta into contact with a screened color-separation negative for magenta in a vacuum frame in registration therewith, exposing the light-sensitive transfer sheet by an arc light, developing the light-sensitive transfer sheet in a 1 percent hydrogen peroxide solution for 2 minutes at 18°C, and washing the light-sensitive transfer sheet thus developed by water at 38°C for removing non-exposed portions of the photosensitive layer.

A dispersion of adhesive, consisting of one part of POLYSOL A-881 and one part of water, was applied on the wet magenta positive image thus washed, and dried by blowing hot air. The magenta positive image was transferred onto a sheet of white art paper in the same manner as Example 1.

Cyan, yellow, and black positive images were prepared by exposing, developing, and washing the light-sensitive transfer sheets for cyan, yellow, and black, respectively, and then transferred onto the sheet of art paper in turn and in registration with each other. Thus, a color-proofing sheet was completed.

It was confirmed by experiments that cellulose acetate phthalate in the stripping film could be substituted by polyvinyl butyral, polymethylmethacrylate, copolymer of methylmethacrylate and vinyl acetate, or methylmethacrylate-ethylacrylate copolymer.

It was also confirmed that an auxiliary layer made of vinylidene chloride-acrylonitrile copolymer could be formed on the stripping film.

Similar results were obtained by substituting NIKASOL S-3001, SAIBINOL L-65, or SAIBINOL L-60 for POLYSOL A-881 in the pressure-sensitive adhesive layer. Furthermore, it was confirmed that the object of the invention can be achieved by using a cellulose acetate film for the support, instead of the aforesaid polyester film.

Example 4

A stripping layer consisting of cellulose acetate phthalate was formed on a polyester support. A photosensitive layer was formed on the stripping layer by applying a solution consisting of the following ingredients on the stripping layer and then drying, so as to complete a light-sensitive transfer sheet.

| | |
|---|---|
| zinc chloride double salt of diazo resin made by condensation of p-diazodiphenyl-amine and paraformaldehyde | 1 gr |
| methanol | 4 gr |
| water | 95 gr |

A developer for magenta was prepared by thoroughly mixing 30 gr of polyamide resin, 23 gr of butanol, 47 gr of toluene, and 3 gr of Brilliant Carmine 6B in a ball mill, and by dispersing the mixture thus prepared in a solution consisting of 150 gr of gum arabic (14° Baume) and 75 gr of water, by using an agitator.

The aforesaid light-sensitive transfer sheet was brought into contact with a screened color-separation negative for magenta in registration therewith by a register-pin-system, and exposed by an arc light. A magenta positive image was produced by carefully wiping the thus exposed photosensitive layer by a piece of cotton soaked with the aforesaid magenta developer while removing the non-exposed diazo resin from the photosensitive layer. Excessive developer was washed away by water.

A thin pressure-sensitive adhesive layer was formed on the thus developed magenta positive image by applying POLYSOL A-881 on the image and then drying.

The developed light-sensitive transfer sheet for magenta was brought into contact with a sheet of white art paper in registration with each other by a register-pin system. By pressing the light-sensitive transfer sheet against the art paper by a roller to bring the adhesive layer in tight contact with the sheet of white art paper, and by peeling off the polyester support, the magenta positive image was transferred onto the white art paper together with the stripping film.

Developers for cyan, yellow, and black images were prepared by substituting phthalocyanine blue, Permanent Yellow FGL, and carbon black for Brilliant Carmine 6B in the developer for magenta, respectively. Cyan, yellow, and black positive images were formed by using screened color-separation negatives for cyan, yellow, and black, respectively, in the manner similar to the magenta positive image, except for using the developer suitable for each color image. A color-proofing sheet was completed by superposing the cyan, yellow and black positive images on the magenta positive image on the white art paper by successively transferring them in registration with each other in the manner similar to that of the transfer of the magenta positive image.

It was confirmed by tests that the same colored images could be achieved by substituting the polyamide resin in the aforesaid developers by polyvinyl butyral, vinylidenechloride-acrylonitrile copolymer.

Tests were made to show that cellulose acetate phthalate in the stripping layer could be substituted by a mixture consisting of one part of partially esterified resin of copolymer of styrene and maleic anhydride and one part of methoxymethylnylon.

Example 5

A 2 micron thick cellulose acetate stripping layer was made on a 50 micron thick polyester support. A diazo resin coating was made on the stripping layer by applying a solution of the following composition and drying it. The solution consisted of

| | |
|---|---|
| zinc chloride double salt of diazo resin made by condensation of p1-diazodiphenyl-amine and paraformaldehyde | 1 gr |
| methanol | 4 gr |
| water | 95 gr |

A pigment dispersion was prepared by treating 4 gr of polyvinyl formal, 2 gr of Benzidine Yellow GR, and 94 gr of 1,1,2-trichloroethane in a ball mill, and the dispersion was diluted by 100 gr of 1,1,2-trichloroethane. A light-sensitive transfer sheet for yellow was formed by applying the diluted dispersion on the diazo resin coating and then by drying.

Light-sensitive transfer sheets for magenta, cyan, and black, were produced by substituting Benzidine Yellow GR in the aforesaid pigment dispersion by Brilliant Carmine 6B, phthalocyanine blue, and carbon black respectively.

The light-sensitive transfer sheets were contact-printed with the corresponding screened color-separation negatives, respectively, by using an arc light. In the case of photosensitive transfer sheets for dark colors, having a dark coloring layer on the photosensitive layer, such as black, it is preferable to expose them from the support side, instead of the photosensitive layer side. In this case, the support should, of course, be transparent. The exposed light-sensitive transfer sheets were developed by pouring a solvent mixture, consisting of two parts by volume of iso-propanol and one part by volume of water, onto the thus exposed surface of the light-sensitive transfer sheets. By gently wiping the exposed surface with cotton, the coating on the colored polyvinyl formal resin at the non-exposed portions was gradually removed, so that colored positive images of different colors were produced.

A thin adhesive layer is formed on each of the thus developed colored positive images, by applying an adhesive dispersion, consisting of one part of pressure-sensitive POLYSOL A–881 and 1.5 part of water, on the surface of each colored positive image and by drying the thus applied dispersion by blowing hot air thereon.

A color-proofing sheet is formed by successively transferring the thus developed colored positive images of different colors in registration with each other on a sheet of white plastic film, such as Scotch Print (a product of Minnesota Mining and Manufacturing Co., U.S.A).

It was found that polyvinyl formal in the pigment dispersion resin coating on the diazo resin could be substituted by polyvinyl butyral, polyamide resin, and the like. Tests were made to show that POLYSOL A–881 in the pressure-sensitive adhesive layer could be substituted by NIKASOL S–3001, or SAIBINOL L–65 or L–60.

EXAMPLE 6

A 1.5 micron thick polyvinyl chloride stripping layer was formed on a 50 micron thick polyester support.

A light-sensitive transfer sheet for yellow was prepared by roller coating a photosensitive solution of the following composition and then drying.

| | |
|---|---|
| 4′-[-]naphthoquinone-1,2)-diazid-(2)-sulfonyloxy-(5)]-2′,3′-dihydroxybenzophenon (German Pat. No. 938,233, Example 1) | 2 gr |
| phenolformaldehyde novolac resin | 0.5 gr |
| Fat Yellow – 5G | 1.5 gr |
| ethylene glycol monomethyl ether | 96 gr |

Light-sensitive transfer sheets for magenta, cyan, and black were prepared by substituting Fat Yellow-5G of the aforesaid photosensitive solution by Zapon Fast Red BB, Zapon Fast Blue HFL, and Fat Black HB, respectively. The light-sensitive transfer sheets for different colors were contact exposed kept in contact with screened color-separation positives for the corresponding colors in registration therewith by a commonly used register-mark-system, respectively. Positive images of the different colors were made by dipping the thus exposed light-sensitive transfer sheets in an alkali developer, so that exposed portions of the photosensitive layer could be removed by being dissolved in the developer.

Adhesive layers were formed on the colored positive by pouring one of the following pressure-sensitive adhesive.

- a 5 percent solution of polyvinylisobutyl ether in n-hexane
- a 10 percent solution of polyisobutylene resin in SHELL-SOL 71
- a dispersion prepared by diluting one part of POLYSOL A–881 (an emulsion of polyacrylic ester, made by High Polymer Chemical Industries Ltd.) by one part of water
- a dispersion prepared by diluting one part of POLYSOL Adhesive 40 (a synthetic rubber emulsion, made by High Polymer Chemical Industries Ltd.) by one part of water.

A color-proofing sheet was completed by successively transferring positive images thus formed on a sheet of white art paper in registration with each other.

Example 7

A light-sensitive transfer sheet for yellow was prepared by forming a polyvinyl chloride stripping layer on a polyester support, and applying and drying a solution having the following composition.

| | |
|---|---|
| naphthoquinone-(1,2)-diazidosulfonic ester | 3 gr |
| SEIKAGEN–O–Yellow–GA–M (a yellow coloring agent bonded to polymer made by Dainichi Seika Kogyo Co.) | 1.5 gr |
| acetone | 40 gr |
| ethyleneglycolmonomethyl ether | 60 gr |

Light-sensitive transfer sheets for magenta, cyan, and black were similarly prepared by substituting SEIKAGEN-0-Yellow-GA-M by SEIKAGEN-0-Red-2BA-M, SEIKAGEN-0-Blue-GK-M, and a mixture of the three SEIKAGEN pigments, respectively. The light-sensitive transfer sheets for different colors were contact exposed by a xenon arc light while being kept in contact with screened color-separation positives of the corresponding colors in registration with each other, respectively. Positive images of the different colors were made by dipping the thus exposed transfer sheets in an alkali developer, so that exposed portions of the photosensitive layers could be removed by being dissolved in the developer. The colored positive images were washed with water after the development.

An adhesive layer was formed on a sheet of white synthetic resin paper, e.g., Q'kote (a product of N.K. Special Paper Making Co.), by brushing an adhesive solution consisting of a 5 percent solution of polyvinylisobutylene ether in n-hexane and then drying. The yellow positive image on the transfer sheet developed in the aforesaid manner was placed on the adhesive layer and pressed thereto, and upon peeling of the polyester support, the yellow positive image was transferred onto the Q'kote, together with the polyvinyl chloride stripping layer.

The aforesaid adhesive solution was applied again on the yellow positive image thus transferred on the Q'-kote, and dried to form another adhesive layer. The magenta positive image was transferred onto the yellow positive image in registration therewith in the same manner as the transfer of the yellow positive image. A color-proofing sheet was completed by successively transferring cyan and black positive images on the Q'-kote in registration with each other. For effecting accurate registration between the positive images of the different colors, a register-pin-system was used.

It was confirmed by tests that in the adhesive layer, polyvinylisobutylether could be substituted by polyisobutylene, POLYSOL A–881, or POLYSOL Adhesive-40.

The colored positive images obtained in Examples 1 to 6 could be also transferred onto a white sheet in the same manner as described in this Example.

Example 8

A pressure-sensitive adhesive solution consisting of 3 gr of natural rubber, 3 gr of rosin, 3 gr of polybutene, and 91 gr of n-hexane was applied on a stripping paper, and an adhesive layer of 3 gr/m$^2$ density was formed by drying the solution thus applied. The adhesive layer was so designed that if the adhesive layer was pressed against a sheet of art paper with the stripping paper at the back and then separated from the stripping paper by peeling, the adhesive layer was transferred onto the art paper.

A light-sensitive transfer sheet for magenta, as described in Example 3, was exposed, developed, and dried in the aforesaid manner for producing a magenta positive image. The light-sensitive transfer sheet with the magenta positive image was pressed by a hard rubber roller against the art paper sheet with the adhesive layer transferred thereon, and upon peeling of the support away from the light-sensitive transfer sheet, the magenta positive image was transferred onto the art paper sheet together with a stripping layer made of cellulose acetate phthalate.

Another adhesive layer was overlaid on the thus transferred magenta positive image in the same manner as the first adhesive layer. Then a cyan positive image was transferred onto the last mentioned adhesive layer. A color-proof sheet was completed by successively overlaying an yellow positive image and a black positive image onto the magenta and cyan images in registration with each other.

It was confirmed that the aforesaid pressure-sensitive adhesive solution could be substituted by polyisobutylene or polyvinylisobutyl ether.

A known pressure-sensitive transfer film in which a pressure-sensitive adhesive film was rolled up together with a sheet of stripping paper, e.g., "DOUBLE-FACE" manufactured by Toyo Ink Seizo Kabushiki Kaisha, could be also used in the same manner as the aforesaid adhesive layer of this Example.

Light-sensitive transfer sheets of the preceding Examples other than Example 3 could apparently be used for preparation of a color-proofing sheet in the manner as described in this Example.

Example 9

A solution of heat-sensitive adhesive having the following composition was poured on a sheet of white art paper and then dried, in order to form an adhesive layer on the art paper. The solution consisted of

| | |
|---|---|
| ethyl cellulose | 1 gr |
| Hercolyn (methyl ester of hydrogenated rosin) | 2 gr |
| rosin | 7 gr |
| xylol | 20 gr |
| n-hexane | 80 gr |

Colored positive images of different colors were prepared by exposing, developing, and drying the light-sensitive transfer sheets of Example 3. The first light-sensitive transfer sheet was overlaid on the adhesive layer formed on the white art paper sheet, pressed thereto by a hot roller at 80°C, and cooled. The polyester support of the light-sensitive transfer sheet was peeled off, so that the first colored positive image was transferred onto the white art paper together with the stripping film made of cellulose acetate phthalate.

A color-proofing sheet was prepared by alternately repeating the transfer of the adhesive layers and the colored positive images onto the white art paper, on which the first colored positive image had been transferred. The colored positive images of different colors were placed in registration with each other on the white art paper.

It was confirmed that in lieu of the aforesaid heat-sensitive adhesive solution, polyvinyl acetate or a mixture of polyvinyl butyral and dioctylphthalate could also be used in the heat-sensitive adhesive layer.

The light-sensitive transfer sheets of the preceding Examples other than Example 3 could also be used for preparing a color-proofing sheet in the same manner as described in this Example.

The heat-sensitive adhesive layer can be formed on each colored image of developed photosensitive transfer sheet prior to transferring the colored image, instead of applying on the receiving surface of the image-receiving sheet with or without having previously transferred images.

Example 10

A light-sensitive transfer sheet for black, prepared in the same manner as Example 1, was contact-exposed to actinic light through an ordinary photographic negative film. The light-sensitive transfer sheet was then developed and provided with an adhesive layer in the same manner as Example 1. The black image thus formed on the light-sensitive transfer sheet was then transferred onto a flat aluminum sheet, for displaying the black positive image of the picture carried by the photographic negative film.

Example 11

Yellow, magenta, cyan, and black images were prepared in the same manner as Example 2, and the four images of different colors were transferred on an aluminum sheet. Similarly, four images of different colors were transferred in registration with each other onto a sheet of milk-white plastic board, and the same four color transfer was repeated onto a glass board, and a melamine resin laminated sheet, respectively.

What is claimed is:

1. A method for transferring a colored image, comprising providing a photosensitive layer mainly consisting of photo-polymer on a transparent stripping layer coated on a dimensionally stable support, exposing said photosensitive layer to actinic light carrying an image to selectively change the solubility of the photosensitive layer to produce a latent image, developing said photosensitive layer to produce a latent image, developing said photosensitive layer by selectively removing comparably more soluble portions thereof to produce a visible image, and coloring the visible image portions of the photosensitive layer to produce a colored image representing said light image, pressing said support against an image-receiving member after applying an adhesive layer between said colored image and a receiving surface of the image-receiving member, and peeling off the support from the stripping layer to transfer said colored image onto the image-receiving member together with said stripping layer.

2. A method according to claim 1 wherein the thickness of said stripping layer is from 1 to 5 microns.

3. A method for transferring a colored image according to claim 1, wherein said photosensitive layer is developed by a developer containing coloring agent.

4. A method for transferring a colored image according to claim 1, wherein said colored image is formed by applying coloring agent thereto after the removal of the unhardened portions of the photosensitive layer.

5. A method for transferring a colored image according to claim 1 and further comprising the step of overlaying a resin layer containing coloring agent on said photosensitive layer.

6. A method for preparing a color-proofing sheet, comprising providing light-sensitive transfer sheets, each made by overlaying a photosensitive layer mainly consisting of photopolymer onto a transparent stripping layer coated on a dimensionally stable support, exposing said light-sensitive transfer sheets to actinic light through color-separation films, respectively, developing the light-sensitive transfer sheets for producing colored images, respectively, pressing said light-sensitive transfer sheets in turn against an image-receiving sheet after applying an adhesive layer between each colored image to be transferred and receiving surface of said image-receiving sheet, respectively, peeling off the support from each light-sensitive sheet to transfer the corresponding colored image onto the image-receiving sheet together with the related stripping layer, and repeating said pressing and peeling until all the colored images of different colors are transferred onto the image-receiving sheet.

7. A method according to claim 6 wherein the thickness of said stripping layer is from 1 to 5 microns.

8. A method according to claim 6, wherein said adhesive layer is applied to each colored image before transferring to said image-receiving sheet.

9. A method according to claim 6, wherein said adhesive layer is applied onto that surface of the image-receiving sheet to which each colored image is transferred, prior to each transfer of said colored image onto the image-receiving sheet.

10. A method according to claim 6, wherein said adhesive layer is applied on the colored image by pouring a solution of adhesive on the colored image and then drying.

11. A method according to claim 6, wherein said adhesive layer is applied on the colored image by pressing a preformed adhesive film thereon.

12. A method according to claim 6, wherein said adhesive layer is applied on said surface of the image-receiving sheet by pouring a solution of adhesive thereon and then drying.

13. A method according to claim 6, wherein said adhesive layer is applied on said surface of the image-receiving sheet by pressing a preformed adhesive film thereon.

14. A method for transferring a multi-colored image, comprising providing a photosensitive layer mainly consisting of photopolymer on a transparent stripping layer coated on a dimensionally stable support, exposing said photosensitive layer to actinic light of a first color component of a multi-color picture to be transferred, developing said photosensitive layer for producing a first image of said first color representing said first color component of said multi-color picture, pressing said support against an image-receiving member after applying an adhesive layer between said colored image and a receiving surface of the image-receiving member, peeling off the support from the stripping layer to transfer said colored image onto the image-receiving member together with said stripping layer, and repeating steps from said exposing to said peeling until all the color components of the multi-color picture are transferred onto the image-receiving member.

15. A method according to claim 14 wherein the thickness of said stripping layer is from 1 to 5 microns.

16. A method according to claim 1, wherein said photosensitive layer contains coloring agent, so as to produce said colored image upon removal of the more soluble portion of the photosensitive layer.

* * * * *